(12) United States Patent
Lindoff et al.

(10) Patent No.: US 9,794,873 B2
(45) Date of Patent: Oct. 17, 2017

(54) POWER SAVING IN WIRELESS TRANSCEIVER DEVICE

(71) Applicant: Telefonaktiebolaget L M Ericsson (publ), Stockholm (SE)

(72) Inventors: Bengt Lindoff, Bjarred (SE); Yufei Blankenship, Kildeer, IL (US); Stefano Sorrentino, Solna (SE)

(73) Assignee: TELEFONAKTIEBOLAGET LM ERICSSON (publ), Stockholm (SE)

( * ) Notice: Subject to any disclaimer, the term of this patent is extended or adjusted under 35 U.S.C. 154(b) by 239 days.

(21) Appl. No.: 14/541,320

(22) Filed: Nov. 14, 2014

(65) Prior Publication Data
US 2016/0142974 A1    May 19, 2016

(51) Int. Cl.
*H04W 52/02*    (2009.01)
*H04B 1/40*    (2015.01)
(Continued)

(52) U.S. Cl.
CPC .......... *H04W 52/0209* (2013.01); *H04B 1/40* (2013.01); *H04W 52/0216* (2013.01);
(Continued)

(58) Field of Classification Search
CPC ............. H04W 52/0209; H04W 56/00; H04W 76/023; H04W 52/0216; H04W 52/0229;
(Continued)

(56) References Cited

U.S. PATENT DOCUMENTS

| 2007/0143637 A1* | 6/2007 | Tsai ...................... G06F 1/3215 713/300 |
| 2013/0021932 A1* | 1/2013 | Damnjanovic ... H04W 52/0229 370/252 |

(Continued)

FOREIGN PATENT DOCUMENTS

| EP | 2665297 A1 | 11/2013 |
| WO | 2010006649 A1 | 1/2010 |

(Continued)

OTHER PUBLICATIONS

PCT International Search Report, mailed Feb. 9, 2016, in connection with International Application No. PCT/EP2015/074443, all pages.

(Continued)

*Primary Examiner* — Brian O'Connor
(74) *Attorney, Agent, or Firm* — Leffler Intellectual Property Law, PLLC

(57) ABSTRACT

A device-to-device (D2D) communication network supports a wireless D2D link between a first wireless transceiver and a second wireless transceiver, the second wireless transceiver accessing a cellular communication network via the first wireless transceiver. The first wireless transceiver receives capability information from the second wireless transceiver on wireless D2D communication resources and transmits, to the second transceiver, power saving information about a power saving mode configuration based on the received capability information. The power saving information comprises information about sleep periods and active (Continued)

periods of the second transceiver. A sync signal is transmitted with a timing based at least partly on the power saving mode configuration, for facilitating re-synchronization of the second wireless transceiver with the first wireless transceiver in conjunction with an end of a sleep period of the second wireless transceiver in accordance with the power saving mode configuration.

22 Claims, 5 Drawing Sheets

(51) Int. Cl.
*H04W 56/00* (2009.01)
*H04W 76/02* (2009.01)
*H04L 5/00* (2006.01)
*H04W 72/04* (2009.01)
*H04W 76/04* (2009.01)
*H04W 84/04* (2009.01)

(52) U.S. Cl.
CPC ....... *H04W 52/0229* (2013.01); *H04W 56/00* (2013.01); *H04W 76/023* (2013.01); *H04L 5/0055* (2013.01); *H04W 72/0406* (2013.01); *H04W 76/048* (2013.01); *H04W 84/042* (2013.01); *Y02B 60/50* (2013.01)

(58) Field of Classification Search
CPC ........... H04W 72/0406; H04W 84/042; H04W 76/048; H04B 1/40; H04L 5/0055; Y02B 60/50
See application file for complete search history.

(56) References Cited

U.S. PATENT DOCUMENTS

| | | | |
|---|---|---|---|
| 2013/0157670 A1 | 6/2013 | Koskela et al. | |
| 2013/0182614 A1 | 7/2013 | Kumar et al. | |
| 2013/0308490 A1* | 11/2013 | Lim | H04B 7/026 370/252 |
| 2014/0010099 A1 | 1/2014 | Chiu et al. | |
| 2014/0293851 A1 | 10/2014 | Abraham et al. | |
| 2014/0314057 A1* | 10/2014 | Van Phan | H04W 56/0045 370/336 |
| 2015/0009910 A1* | 1/2015 | Ryu | H04W 72/04 370/329 |
| 2015/0282070 A1* | 10/2015 | Salem | H04W 52/0206 370/311 |
| 2016/0105848 A1* | 4/2016 | Li | H04L 1/08 370/329 |
| 2016/0128129 A1* | 5/2016 | Kahtava | H04L 1/00 370/311 |
| 2016/0174148 A1* | 6/2016 | Seed | H04W 52/0216 370/311 |

FOREIGN PATENT DOCUMENTS

| | | |
|---|---|---|
| WO | 2013162196 A1 | 10/2013 |
| WO | 2013177447 A1 | 11/2013 |
| WO | 2014168571 A2 | 10/2014 |

OTHER PUBLICATIONS

PCT Written Opinion, mailed Feb. 9, 2016, in connection with International Application No. PCT/EP2015/074443, all pages.
3GPP TSG RAN WG1 Meeting #75, R1-135175, San Francisco, USA, Nov. 11-15, 2013, Synchronization Design for D2D communication, 4 pages.
3GPP TSG RAN WG1 Meeting #77, R1-142147, Seoul, Korea, May 19-23, 2014, Discussion on Signaling for D2D Communication Resource Allocation, 8 pages.
PCT International Search Report, mailed Feb. 8, 2016, in connection with International Application No. PCT/EP2015/074417, all pages.
PCT Written Opinion, mailed Feb. 8, 2016, in connection with International Application No. PCT/EP2015/074417, all pages.
3GPP TSG RAN WG2 #84, R2-134311, San Francisco, USA, Nov. 11-15, 2013, Resource allocation schemes for D2D communication, 11 pages.
PCT International Search Report, mailed Jan. 19, 2016, in connection with International Application No. PCT/EP2015/074477, all pages.
PCT Written Opinion, mailed Jan. 19, 2016, in connection with International Application No. PCT/EP2015/074477, all pages.

* cited by examiner

POWER SAVING IN WIRELESS TRANSCEIVER DEVICE

TECHNICAL FIELD

The present disclosure relates to methods and devices for saving power in a wireless transceiver device in a wireless device-to-device (D2D) based communications network.

BACKGROUND

In communications networks, there may be a challenge to obtain good performance and capacity for a given communications protocol, its parameters and the physical environment in which the communications network is deployed.

For example, D2D communications has recently been proposed as an underlay to cellular communications networks as a means to take advantage of the proximity of communicating devices and at the same time to allow the communicating devices to operate in a controlled interference environment. Typically, it is suggested that such D2D communication shares the same spectrum as the cellular communications network, for example by reserving some of the cellular uplink resources for D2D purposes.

D2D communication is as such known in the art and a component of existing wireless technologies, including ad hoc and cellular networks. Examples of D2D communication based techniques include Bluetooth and several variants of the Institute of Electrical and Electronics Engineers (IEEE) 802.11 standards suite such as WiFi Direct. These D2D based communication systems operate in unlicensed spectrum.

D2D communications is currently being defined for Release 12 (Rel-12) of the 3rd Generation Partnership Project (3GPP) Long Term Evolution (LTE). A range of services have been identified, which can be provided by the 3GPP system based on user equipment (i.e., communicating device) being in proximity to each other.

Two ways to utilize the D2D communication link are direct discovery and direct communication. In both cases, the transmitting communicating device sends D2D signals that should be directly received at least by the intended receiving communicating device. Additional applications include relaying, where a communicating device relays data received from a network infrastructure or a communicating device to another communicating device, or vice-versa. Some services which may benefit from such D2D communication are commercial services and Public Safety.

Allocating dedicated spectrum for D2D purposes may be regarded as a less likely alternative as spectrum is a scarce resource and (dynamic) sharing between the D2D services and cellular services could be more flexible and could provide higher spectrum efficiency. In terms of the physical layer, the Rel-12 D2D link operates in uplink spectrum (in the case of Frequency-Division Duplex, FDD) or uplink sub-frames (in the case of Time-Division Duplex, TDD). A D2D signal and wide area network signal can be multiplexed on a given carrier using Time Division Multiplexing (TDM).

D2D based communication networks should also be able to operate in multi-carrier scenarios where the cellular communications network and/or the D2D network is/are configured to operate on multiple carriers. Such carriers do not necessarily belong to a single network operator and are not necessarily coordinated and synchronized.

3GPP LTE has been investigated as a competitive radio access technology for efficient support of Machine-Type Communication (MTC). Some MTC use cases relate to devices being deployed deep inside buildings, which would require coverage enhancement in comparison to the defined coverage of the existing cellular communications network. However, it may be efficient for network operators to be able to serve MTC user equipment using already deployed radio access technology.

3GPP LTE Rel-12 has defined a user equipment power saving mode, allowing long battery lifetime and a new user equipment category allowing reduced modem complexity. In 3GPP LTE Rel-13, further development of MTC may further reduce user equipment cost and provide coverage enhancement. One element to enable cost reduction is to introduce a reduced user equipment radio frequency bandwidth of about 1.4 MHz in the downlink and uplink within any network bandwidth. Lowering the cost of MTC user equipment is a further enabler for implementation of the concept of "internet of things" (IoT). MTC user equipment used for many applications will require low operational power consumption and are expected to communicate with infrequent small burst transmissions.

As a proposal for low power, low complexity MTC communication, the MTC devices may communicate with a relay node by using LTE D2D communication. The relay node may then communicate with a radio access network node (such as an evolved Node B (eNodeB or eNB)) of the cellular communications network (such as LTE). One advantage of using such an approach is that a coverage enhancement (as required in Rel-13) can be reached, as well as some of the MTC complexity being moved to a single relay node. Hence, by using D2D communication via the relay node (that may act as a relay for several MTC devices) a LTE based capillary network structure can be built.

Based on the abovementioned D2D communications approach, it is envisioned that a multi-hop system with flexible D2D communications links between wireless devices acting as relays and wireless devices acting as MTC devices may be set up. However, there is currently no support for efficiently setting up the links between wireless devices acting as relays and wireless devices acting as MTC devices, nor is there an efficient multi-hop radio interface for supporting low power and low cost MTC.

There is thus a need for defining and configuring a power saving mode (PSM) in a multi-hop scenario. Applying the prior art Rel-12 PSM defined for single link eNB-MTC connection may have several short comings:

PSM Rel-12 are not defined for small bandwidth (BW) MTC devices, why prior art method could not be applied.

PSM Rel-12 are not defined for TDD D2D communications and their specific limitations with regard to communication between the relay and the MTC user device (UE).

Recovery/re-establishment procedures for PSM that fit within the frame work of small BW MTC UEs communicating via relay nodes are not defined in Rel-12.

PSM Rel-12 are not defined for multi-hop systems in general.

SUMMARY

It is an objective of the present disclosure to provide improved methods and devices for configuring a power saving mode in a wireless transceiver device (e.g. a UE) in a multi-hop scenario which at least alleviates problems with the prior art.

According to an aspect of the present disclosure, there is provided a method performed by a first wireless transceiver device in a device-to-device (D2D) communication network supporting wireless D2D link between the first wireless transceiver device and a second wireless transceiver device in the D2D network. The second wireless transceiver device is provided with access to a cellular communication network via the first wireless transceiver device. The method comprises receiving capability information from the second wireless transceiver device on wireless D2D communication resources. The method also comprises transmitting power saving information about a power saving mode configuration based on the received capability information to the second transceiver device. The power saving information comprises information about sleep periods and active periods of the second transceiver device. The method also comprises transmitting a sync signal with a timing based at least in part on the power saving mode configuration, for facilitating re-synchronization of the second wireless transceiver device with the first wireless transceiver device in conjunction with an end of a sleep period of the second wireless transceiver device in accordance with the power saving mode configuration.

According to another aspect of the present disclosure, there is provided a first wireless transceiver device for a D2D communication network supporting wireless D2D link between the first wireless transceiver device and a second wireless transceiver device in the D2D network. The first wireless transceiver device is configured for providing the second wireless transceiver device with access to a cellular communication network via the first wireless transceiver device. The first wireless transceiver device comprises a processing unit, and a storage medium storing instructions executable by said processing unit whereby said first wireless transceiver device is operative to receive capability information from the second wireless transceiver device on wireless D2D communication resources. The first wireless transceiver device is also operative to transmit power saving information about a power saving mode configuration based on the received capability information to the second transceiver device. The power saving information comprises information about sleep periods and active periods of the second transceiver device. The first wireless transceiver device is also operative to transmit a sync signal with a timing based at least in part on the power saving mode configuration, for facilitating re-synchronization of the second wireless transceiver device with the first wireless transceiver device in conjunction with an end of a sleep period of the second wireless transceiver device in accordance with the power saving mode configuration.

According to another aspect of the present disclosure, there is provided a method performed by a second wireless transceiver device in a D2D communication network supporting wireless D2D link between the second wireless transceiver device and a first wireless transceiver device in the D2D network. The second wireless transceiver device is provided with access to a cellular communication network via the first wireless transceiver device. The method comprises transmitting capability information to the first wireless transceiver device on wireless D2D communication resources. The method also comprises determining power saving information about a power saving mode configuration, the power saving information comprising information about sleep periods and active periods of the second transceiver device. The method also comprises entering a sleep period in accordance with the power saving mode configuration. The method also comprises, in conjunction with an end of the sleep period, re-synchronizing with the first wireless transceiver device by means of receiving a sync signal from said first wireless transceiver device.

According to another aspect of the present disclosure, there is provided a second wireless transceiver device for a D2D communication network supporting wireless D2D link between the second wireless transceiver device and a first wireless transceiver device in the D2D network. The second wireless transceiver device is configured for being provided access to a cellular communication network via the first wireless transceiver device. The second wireless transceiver device comprises a processing unit, and a storage medium storing instructions executable by said processing unit whereby said second wireless transceiver device is operative to transmit capability information to the first wireless transceiver device on wireless D2D communication resources. The second wireless transceiver device is also operative to determine power saving information about a power saving mode configuration. The power saving information comprises information about sleep periods and active periods of the second transceiver device. The second wireless transceiver device is operative to enter a sleep period in accordance with the power saving mode configuration. second wireless transceiver device is operative to, in conjunction with an end of the sleep period, re-synchronize with the first wireless transceiver device by means of receiving a sync signal from said first wireless transceiver device.

According to another aspect of the present disclosure, there is provided a computer program product comprising computer-executable components for causing a wireless transceiver device (e.g. the first or second wireless transceiver device, as discussed herein) to perform an embodiment of a method of the present disclosure when the computer-executable components are run on processor circuitry comprised in the wireless transceiver device.

According to another aspect of the present disclosure, there is provided a computer program comprising computer program code which is able to, when run on processor circuitry of a first wireless transceiver device in a D2D communication network supporting wireless D2D link between the first wireless transceiver device and a second wireless transceiver device in the D2D network wherein the second wireless transceiver device is provided with access to a cellular communication network via the first wireless transceiver device, cause the first wireless transceiver device to receive capability information from the second wireless transceiver device on wireless D2D communication resources. The code is also able to cause the first wireless transceiver device to transmit power saving information about a power saving mode configuration based on the received capability information to the second transceiver device. The power saving information comprises information about sleep periods and active periods of the second transceiver device. The code is also able to cause the first wireless transceiver device to transmit a sync signal with a timing based at least in part on the power saving mode configuration, for facilitating re-synchronization of the second wireless transceiver device with the first wireless transceiver device in conjunction with an end of a sleep period of the second wireless transceiver device in accordance with the power saving mode configuration.

According to another aspect of the present disclosure, there is provided a computer program comprising computer program code which is able to, when run on processor circuitry of a second wireless transceiver device in a D2D communication network supporting wireless D2D link between the second wireless transceiver device and a first wireless transceiver device in the D2D network wherein the second wireless transceiver device is provided with access to a cellular communication network via the first wireless transceiver device, cause the device to transmit capability information to the first wireless transceiver device on wireless D2D communication resources. The code is also able to cause the second wireless transceiver device to determine power saving information about a power saving mode configuration, the power saving information comprising information about sleep periods and active periods of the second transceiver device. The code is also able to cause the second wireless transceiver device to enter a sleep period in accordance with the power saving mode configuration. The code is also able to cause the second wireless transceiver device to, in conjunction with an end of the sleep period, re-synchronize with the first wireless transceiver device by means of receiving a sync signal from said first wireless transceiver device.

According to another aspect of the present disclosure, there is provided a computer program product comprising an embodiment of a computer program of the present disclosure and a computer readable means on which the computer program is stored.

By means of the aspects of the present disclosure, a power saving mode can be configured in the second wireless transceiver device in a multi-hop scenario where the second wireless transceiver device is connected via the first wireless transceiver device (at least partly acting as a relay). The first wireless transceiver device may to different extents handle the second wireless transceiver device in stead of a network node of the cellular communication network. Thereby, power can be saved in the second wireless transceiver device.

It is understood that "power saving mode" should be interpreted in the broad sense, and not limited by the existing power saving mode defined in 3GPP, referring to any techniques that may be adopted to allow a wireless transceiver device to stay in an inactive state (or sleep state, or powered-off state) as much as possible to save power and extend battery life. In one example, the power saving mode may be timer-based and the wireless transceiver device enters inactive state one time each time a timer is set. The wireless transceiver device enters inactive state when the timer is set. The timer keeps running while the wireless transceiver device is inactive. And the wireless transceiver device changes from inactive state to active state when the timer is up. In another example, the power saving mode may be realized by triggering the wireless device to toggle between active periods and inactive periods. The wireless transceiver device alternates between inactive state and active state with defined periodicity. In yet another example, the power saving mode is triggered by events, e.g., the wireless transceiver device enters inactive state when a condition (such as end of payload delivery) is satisfied, and exits the inactive state when another condition (such as arrival of data payload) is satisfied. The term "reduced power mode" may be used interchangeably with "power saving mode". Also, the term "sleep period" used herein may be interchangeably substituted with the term "inactivity period". Instead of using the term "period", the term "state", such as in sleep/inactivity state or active state, may be used since the periods/states discussed herein are not necessarily periodical.

It is to be noted that any feature of any of the aspects may be applied to any other aspect, wherever appropriate. Likewise, any advantage of any of the aspects may apply to any of the other aspects. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. The use of "first", "second" etc. for different features/components of the present disclosure are only intended to distinguish the features/components from other similar features/components and not to impart any order or hierarchy to the features/components.

BRIEF DESCRIPTION OF THE DRAWINGS

Embodiments will be described, by way of example, with reference to the accompanying drawings, in which.

DETAILED DESCRIPTION

Embodiments will now be described more fully hereinafter with reference to the accompanying drawings, in which certain embodiments are shown. However, other embodiments in many different forms are possible within the scope of the present disclosure. Rather, the following embodiments are provided by way of example so that this disclosure will be thorough and complete, and will fully convey the scope of the disclosure to those skilled in the art. Like numbers refer to like elements throughout the description.

A PSM procedure and corresponding configurations are disclosed herein which are suitable for multi-hop scenarios, e.g. in LTE, and wireless transceiver devices, e.g. MTC devices and a relay node, communicating with each other using D2D and with a system bandwidth smaller than the system bandwidth of the cellular communication network, e.g. LTE. A re-establishment procedure is also provided, in case the re-synchronization after a sleep period timer has expired fails.

Figure 1:
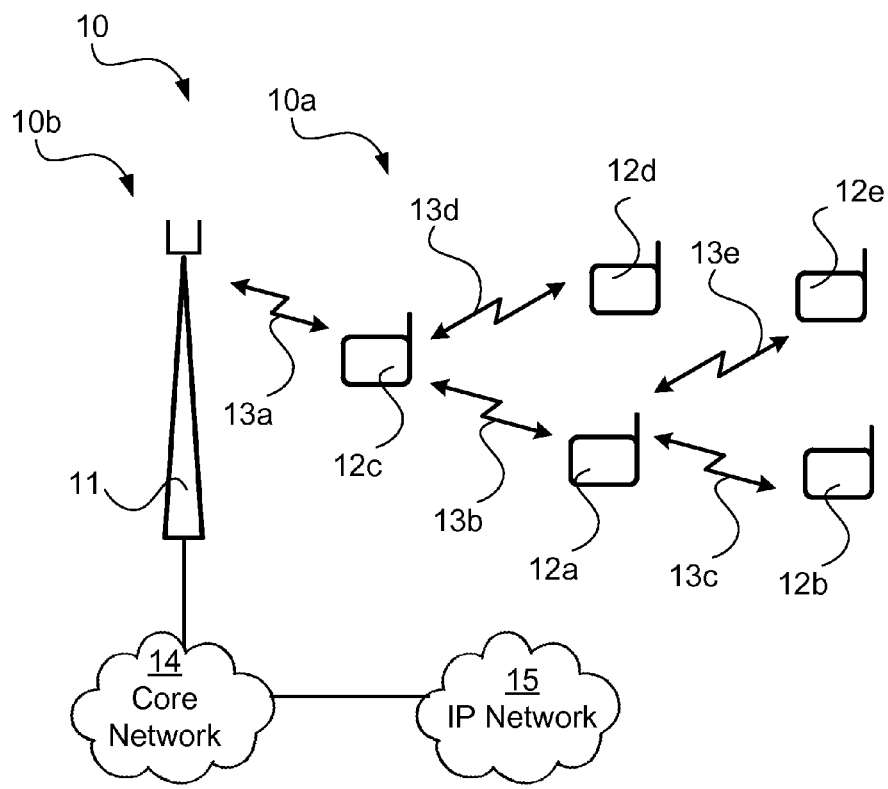
FIG. 1 is a schematic diagram illustrating an embodiment of a communication network according to the present disclosure.

FIG. 1 is a schematic diagram illustrating a communication network 10, comprising a D2D network boa and a cellular network 10b, where embodiments presented herein can be applied. The communication network 10 may generally comply with any one or a combination of W-CDMA (Wideband Code Division Multiplex), LTE (Long Term Evolution), EDGE (Enhanced Data Rates for GSM Evolution, Enhanced GPRS (General Packet Radio Service)), CDMA2000 (Code Division Multiple Access 2000), Time Division Synchronous Code Division Multiple Access (TD-SCDMA) etc., as long as the principles described hereinafter are applicable.

The cellular communication network 10b comprises at least one network (NW) node 11. The network node 11 may be a radio access network (RAN) node, and may be provided as a radio base station, base transceiver station, radio network controller, Node B, eNB, or WiFi access point.

The at least one network node 11 is operatively connected to a core network 14 and arranged to function as a radio base station so as to provide network access to a service network 15 (e.g. the Internet) in the form of radio connectivity to wireless devices (WDs) 12a, 12b, 12c, 12d, 12e. The wireless devices 12a-e may be any combination of a user equipment (UE), a smartphone, a mobile phone, a tablet computer, a laptop computer, a stationary computer, a device-to-device (D2D) communications device, a machine-type communication (MTC) device, a wireless sensor, etc. The wireless devices 12a-e may thus be enabled services and data as provided by the service network 15 by establishing a wireless connection to the network node 11. However, it may be so that some of the wireless devices 12a-e, say all wireless devices except wireless device 12c, are not able to establish a direct wireless connection (i.e., via one link) to the network node 11. Instead, these wireless devices 12a, 12b, 12d, 12e may establish indirect wireless connections (i.e., via at least two links, with one of the wireless devices 12a-e acting as a relay between each pair of links) to the network node. Such links may be established based on D2D communications. In general, D2D communication comprises direct discovery and direct communication between two wireless devices. In some contexts, the D2D communication link may be referred to as a sidelink.

In this way a multi-hop system with flexible D2D communications links between wireless devices 12a, 12c, 12d acting as relays and wireless devices 12b, 12e acting as MTC devices may be set up. However, there is currently no standard for efficiently setting up the links 13b-e between wireless devices acting as relays and wireless devices acting as MTC devices. Herein, the WD 12b in the D2D network boa is chosen to be regarded as the second wireless transceiver device, which uses the first wireless transceiver device 12a as a relay for obtaining access to the cellular network 10b. The first wireless transceiver device 12a may be directly connected to the NW node 11 of the cellular network 10b, or indirectly connected via a third wireless transceiver device 12c.

Figure 2A:
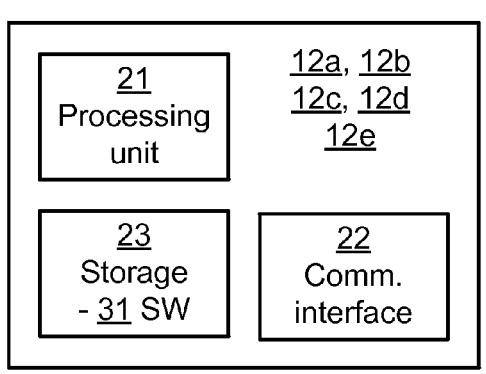
FIG. 2a is a schematic block diagram of an embodiment of a wireless transceiver device of the present disclosure.

FIG. 2a schematically illustrates, in terms of a number of functional units, the components of a wireless device 12a, 12b, 12c, 12d, 12e according to an embodiment. A processing unit (herein also called processor circuitry) 21 is provided using any combination of one or more of a suitable central processing unit (CPU), multiprocessor, microcontroller, digital signal processor (DSP), application specific integrated circuit (ASIC), field programmable gate arrays (FPGA) etc., capable of executing software instructions 31 stored in a computer program product 30 (as in FIG. 3), e.g. in the form of a data storage 23. Thus the processing unit 21 is thereby arranged to execute methods as herein disclosed. The storage medium 23 may also comprise persistent storage, which, for example, can be any single one or combination of magnetic memory, optical memory, solid state memory or even remotely mounted memory. The wireless device 12a-e may further comprise a communications interface 22 for communications with another wireless device 12a-e and/or a network node 11. As such the communications interface 22 may comprise one or more transmitters and receivers, comprising analogue and digital components and a suitable number of antennas for radio communications. The processing unit 21 controls the general operation of the wireless device 12a-e e.g. by sending data and control signals to the communications interface 22 and the storage medium 23, by receiving data and reports from the communications interface 22, and by retrieving data and instructions from the storage medium 23. Other components, as well as the related functionality, of the wireless device 12a-e are omitted in order not to obscure the concepts presented herein. The wireless device 12a-e may be provided as a standalone device or as a part of a further device. For example, the wireless device 12a-e may be provided in a relay device or in an MTC device as discussed herein.

Thus, according to an aspect of the present disclosure, there is provided a first wireless transceiver device 12a for a D2D network boa supporting wireless D2D link between the first wireless transceiver device and a second wireless transceiver device 12b in the D2D network. The first wireless transceiver device is configured for providing the second wireless transceiver device with access to a cellular communication network 10b via the first wireless transceiver device. The first wireless transceiver device comprises a processing unit 21, and a storage medium 23 storing instructions 31 executable by said processing unit 21 whereby said first wireless transceiver device 12a is operative to receive capability information from the second wireless transceiver device 12b on wireless D2D communication resources. The first wireless transceiver device is also operative to transmit power saving information about a power saving mode configuration based on the received capability information to the second transceiver device 12b, the power saving information comprising information about sleep periods and active periods of the second transceiver device. The first wireless transceiver device is also operative to transmit a sync signal with a timing based at least in part on the power saving mode configuration, for facilitating re-synchronization of the second wireless transceiver device 12b with the first wireless transceiver device 12a in conjunction with an end of a sleep period of the second wireless transceiver device in accordance with the power saving mode configuration.

According to another aspect of the present disclosure, there is provided a second wireless transceiver device 12b for a D2D communication network boa supporting wireless D2D link between the second wireless transceiver device and a first wireless transceiver device 12a in the D2D network. The second wireless transceiver device is configured for being provided access to a cellular communication network 10b via the first wireless transceiver device. The second wireless transceiver device comprises a processing unit 21, and a storage medium 23 storing instructions 31 executable by said processing unit 21 whereby said second wireless transceiver device 12b is operative to transmit capability information to the first wireless transceiver device 12a on wireless D2D communication resources. The second device 12b is also operative to determine power saving information about a power saving mode configuration, the power saving information comprising information about sleep periods and active periods of the second transceiver device. The second device 12b is also operative to enter a sleep period in accordance with the power saving mode configuration. The second device 12b is also operative to, in conjunction with an end of the sleep period, re-synchronize with the first wireless transceiver device 12a by means of receiving a sync signal from said first wireless transceiver device.

Figure 2B:
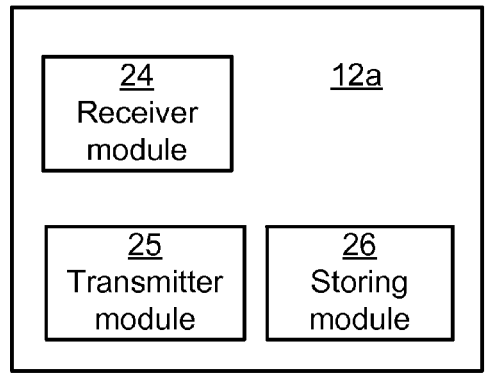
FIG. 2b is a schematic block diagram showing functional modules of an embodiment of a first wireless transceiver device of the present disclosure.

FIG. 2b is a schematic block diagram functionally illustrating an embodiment of the first wireless transceiver device 12a. As previously mentioned, the processor circuitry 21 may run software 31 for enabling the first device 12a to perform an embodiment of a method of the present disclosure, whereby functional modules may be formed in first device 12a e.g. in the processor circuitry 21 for performing the different steps of the method.

These modules are schematically illustrated as blocks within the first device 12a. Thus, the first device 12a comprises a receiver module 24 for receiving capability information from the second wireless transceiver device 12b on wireless D2D communication resources. Further, the first device comprises a transmitter module 25 for transmitting power saving information about a power saving mode configuration based on the received capability information to the second transceiver device 12b, the power saving information comprising information about sleep periods and active periods of the second transceiver device. Also, the transmitter module is configured for transmitting a sync signal with a timing based at least in part on the power saving mode configuration, for facilitating re-synchronization of the second wireless transceiver device 12b with the first wireless transceiver device 12a in conjunction with an end of a sleep period of the second wireless transceiver device in accordance with the power saving mode configuration. In some embodiments of the first device 12a, the first device also comprises a storing module for storing information addressed to the second wireless transceiver device 12b and received from the cellular network 10b (e.g. from the network node 11) during a sleep period of the second wireless transceiver device in accordance with the power saving mode configuration. In those embodiments, the transmitter module may also be configured for transmitting said stored information to the second wireless transceiver device 12b during an active period of the second wireless transceiver device in accordance with the power saving mode configuration.

Figure 2C:
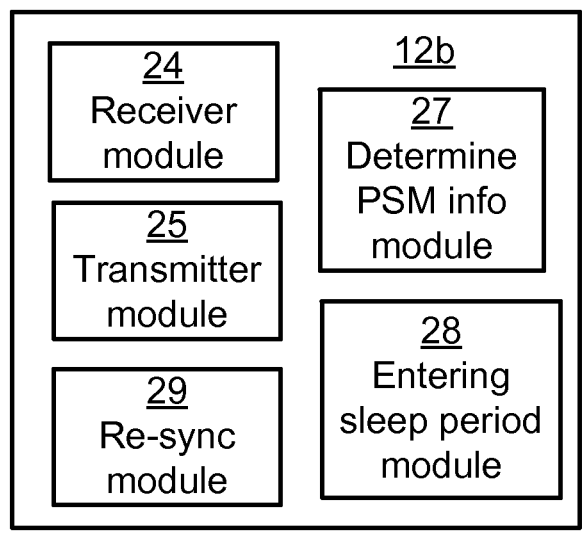
FIG. 2c is a schematic block diagram showing functional modules of an embodiment of a second wireless transceiver device of the present disclosure.

FIG. 2c is a schematic block diagram functionally illustrating an embodiment of the second wireless transceiver device 12b. As previously mentioned, the processor circuitry 21 may run software 31 for enabling the second device 12b to perform an embodiment of a method of the present disclosure, whereby functional modules may be formed in second device 12b e.g. in the processor circuitry 21 for performing the different steps of the method. These modules are schematically illustrated as blocks within the second device 12b. Thus, the second device 12b comprises a transmitter module 25 for transmitting capability information to the first wireless transceiver device 12a on wireless D2D communication resources. The second device 12b also comprises a determining PSM information module 27 for determining power saving information (e.g. comprising receiving the power saving information from the cellular network 10b e.g. via the NW node 11, by means of the receiver module 24) about a power saving mode configuration, the power saving information comprising information about sleep periods and active periods of the second transceiver device. The second device 12b also comprises an entering sleep period module 28 for entering a sleep period in accordance with the power saving mode configuration. The second device 12b also comprises a re-synchronization module 29 for, in conjunction with an end of the sleep period, re-synchronizing the second device 12b with the first wireless transceiver device 12a by means of receiving a sync signal 44 from said first wireless transceiver device by means of the receiver module 24.

Figure 3:
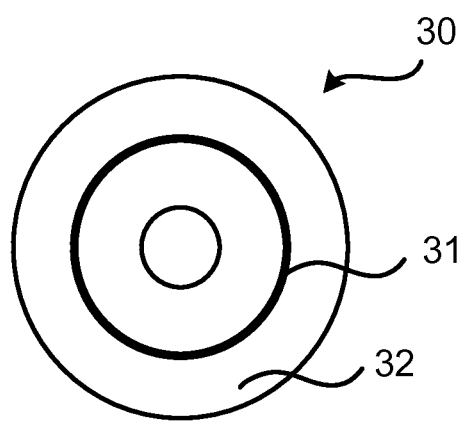
FIG. 3 schematically illustrates an embodiment of a computer program product of the present disclosure.

FIG. 3 illustrates a computer program product 30. The computer program product 30 comprises a computer readable medium 32 comprising a computer program 31 in the form of computer-executable components 31. The computer program/computer-executable components 31 may be configured to cause a wireless transceiver device 12, e.g. a first or second device 12a or 12b as discussed herein, to perform an embodiment of a method of the present disclosure. The computer program/computer-executable components may be run on the processor circuitry 21 of the device 12 for causing the device to perform the method. The computer program product 30 may e.g. be comprised in a storage unit or memory 23 comprised in the device 12 and associated with the processor circuitry 21. Alternatively, the computer program product 30 may be, or be part of, a separate, e.g. mobile, storage means, such as a computer readable disc, e.g. CD or DVD or hard disc/drive, or a solid state storage medium, e.g. a RAM or Flash memory.

Figure 4:
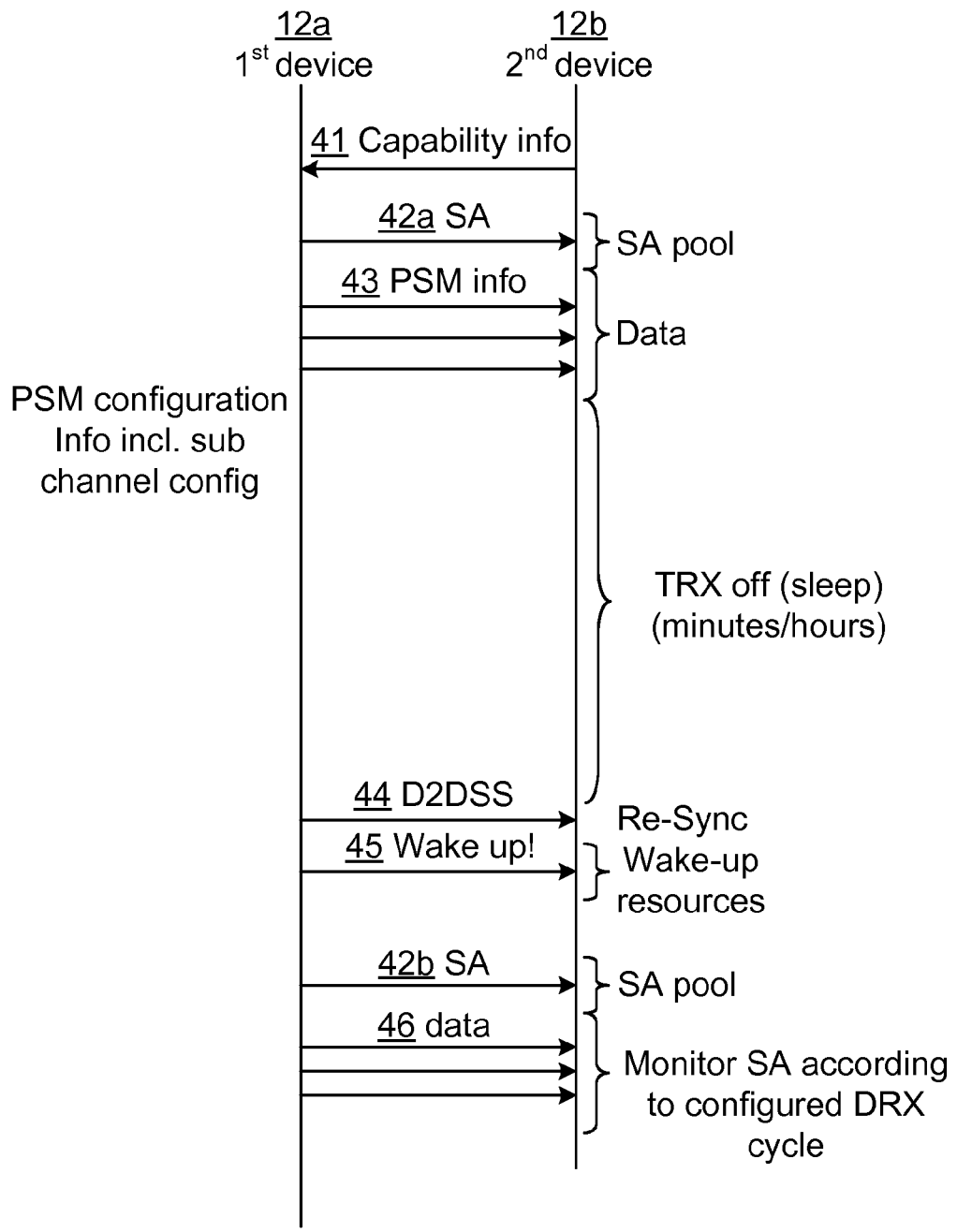
FIG. 4 is a schematic signalling diagram of D2D signalling between first and second wireless transceiver devices of the present disclosure.

FIG. 4 is a schematic signalling diagram of D2D signalling between first and second wireless transceiver devices 12a and 12b of the present disclosure. Once the second device 12b (e.g. an MTC device) detects the first device 12a (e.g. a relay/remote node) it sends capability information 41 to the first device. The information is transmitted on a first configured sub-channel (typically the six central physical resource blocks, PRBs). The PSM configuration is sent to the second device on the first set of frequency/time (f/t) resources. First a scheduling assignment (SA) 42 (called 42a in the figure to distinguish it from other SA) is transmitted and then the actual PSM information 43 which includes timers for active and sleep/inactivity time periods, possibly also DRX cycles used or other information about signals or channels to listen for during the active time periods. The PSM configuration may also include a second set of f/t resources to communicate on for forthcoming sessions. Then the second devices goes to sleep (enters a sleep period) in which the transceiver (TRX) of its communication interface 22 is turned off. Possibly, all functions in the second device 12b are turned off with the exception of a time keeping function running the sleep period timer. The sleep period may have a length of minutes up to hours depending on application. Once the sleep period timer is close to expire, the second device performs a re-sync by synchronizing with the D2D sync signal (SS) 44, which may be send on first or second f/t resources from the first device 12a. Then the second device 12b receives a wake-up signal 45, and monitor for possible paging signals from the NW 10 in accordance with the configured DRX cycle (for example every 2.56 seconds) during the active time period which extends for example 15-30 seconds. The active period timer may be started e.g. in response to the sleep period timer expiring or in response to receiving the wake-up signal 45. During the active period, the second device 12b may receive a scheduling request 42b as well as data 46 addressed to it. Then the second device goes to sleep again and turns on the sleep period timer.

Figure 5A:
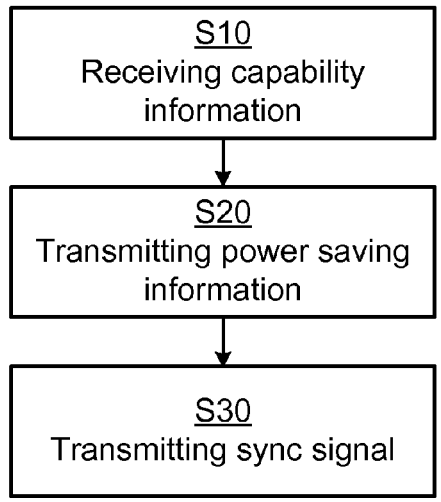
FIG. 5a is a schematic flow chart of an embodiment of a method performed by a first wireless transceiver device.

FIG. 5a is a schematic flow chart of an embodiment of a method performed by a first wireless transceiver device 12a.

The first wireless transceiver device 12a is in a D2D communication network boa supporting wireless D2D link between the first wireless transceiver device and a second wireless transceiver device 12b in the D2D network. The second wireless transceiver device is provided with access to a cellular communication network 10b via the first wireless transceiver device which typically acts as a relay. The first device 12a receives S10 capability information 41 from the second wireless transceiver device 12b on wireless D2D communication t/f resources. Then, the first device 12a transmits S20 power saving information 43 about a power saving mode configuration based on the received capability information to the second transceiver device 12b. The power saving information comprises information about sleep periods and active periods of the second transceiver device. Further, the first device 12a transmits S30 a sync signal 44 with a timing based at least in part on the power saving mode configuration, for facilitating re-synchronization of the second wireless transceiver device 12b with the first wireless transceiver device 12a in conjunction with an end of a sleep period of the second wireless transceiver device in accordance with the power saving mode configuration. Since the first device 12a is at least partly aware of the power saving mode configuration about which it has transmitted S20 information, it may transmit the sync signal 44 when it expects the second device 12b to be listening for it.

Figure 5B:
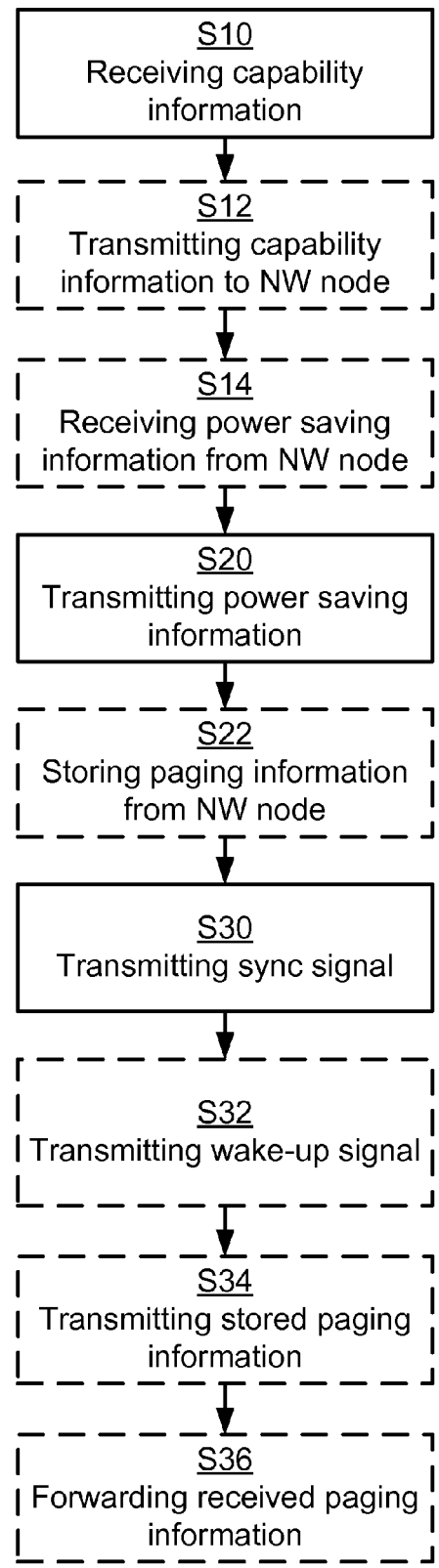
FIG. 5b is a schematic flow chart of another embodiment of a method performed by a first wireless transceiver device.

FIG. 5b is a schematic flow chart of other embodiments of the method performed by a first wireless transceiver device 12a. The steps of receiving S10 capability information, transmitting S20 power saving information and transmitting S30 a sync signal are as discussed in respect of FIG. 5a.

Additionally, after having received S10 the capability information 41, the first device 12a may in some embodiments transmit S12 information about the received S10 capability information to the cellular network 10b, e.g. to the NW node 11. Then, the first device 12a may receive S14 power saving information about the power saving mode configuration from the cellular network 10b before the transmitting S20 power saving information 43 to the second transceiver device 12b. The power saving information 43 may thus be received from the cellular NW 10b, rather than being compiled by the first device 12a itself, before sending the power saving information 43 to the second device 12a.

Additionally or alternatively, the first device 12a may in some embodiments store S22 information addressed to the second wireless transceiver device 12b and received from the cellular network 10b during a sleep period of the second wireless transceiver device in accordance with the transmitted S20 power saving mode configuration. Then, at a later stage, the first device 12a may transmit S34 said stored S22 information to the second wireless transceiver device 12b during an active period of the second wireless transceiver device in accordance with the power saving mode configuration.

Additionally or alternatively, in some embodiments of the method of the present disclosure, after the transmitting S30 of the sync signal 44, the first device 12a may transmit S32 a wake-up signal 45 for prompting the second wireless transceiver device 12b to enter an active period in accordance with the power saving mode configuration.

Additionally or alternatively, in some embodiments of the method of the present disclosure, when the second device 12b is in active during an active period, the first device 12a may forward S36 any paging information to the second device from the cellular NW 10b e.g. the NW node 11. This may be in addition to the transmitting S34 of any stored S22 paging information.

Figure 6A:
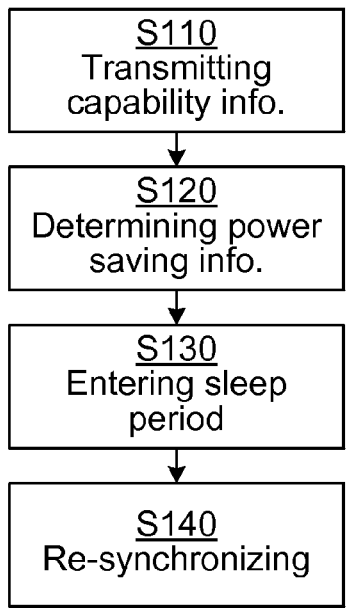
FIG. 6a is a schematic flow chart of an embodiment of a method performed by a second wireless transceiver device.

FIG. 6a is a schematic flow chart of an embodiment of a method performed by a second wireless transceiver device 12b. The second device 12b is in a D2D communication network boa supporting wireless D2D link between the second wireless transceiver device and a first wireless transceiver device 12a in the D2D network. The second wireless transceiver device is provided with access to a cellular communication network 10b via the first wireless transceiver device. The second device 12b transmits Silo capability information 41 to the first wireless transceiver device 12a on wireless D2D communication resources. Before or after, the second device 12b determines S120 power saving information 43 about a power saving mode configuration, the power saving information comprising information about sleep periods and active periods of the second transceiver device. Then, in accordance with the power saving mode configuration for which information was determined S120, the second device 12b enters S130 a sleep period. In conjunction with the end of the sleep period, the second device 12b re-synchronizes S140 with the first wireless transceiver device 12a, aided by a sync signal 44 received from the first wireless transceiver device.

Figure 6B:
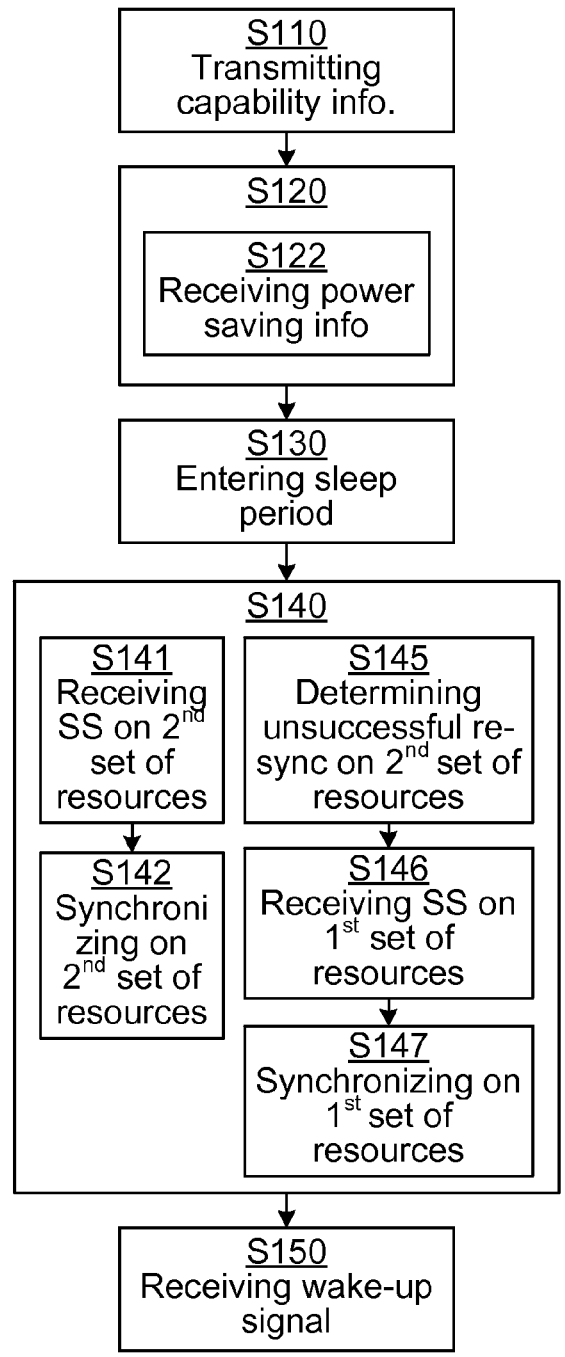
FIG. 6b is a schematic flow chart of another embodiment of a method performed by a second wireless transceiver device.

FIG. 6b is a schematic flow chart of other embodiments of the method performed by a second wireless transceiver device 12b. The steps of transmitting Silo capability information, determining S120 power saving information, entering S130 the sleep period and re-synchronizing S140 with the first device 12a are as discussed in respect of FIG. 6a.

Additionally, in some embodiments of the method of the present disclosure, the determining S120 power saving information 43 comprises the second device receiving S122 the power saving information 43 from the first wireless transceiver device 12a. Alternatively, the power saving information 43 may be pre-configured in the second device 12b.

Additionally or alternatively, in some embodiments of the method of the present disclosure wherein the power saving information 43 is received S122 on a first set of D2D communication recourses, the second device 1213 receives S141 the sync signal 44 on a second set of f/t resources which is at least partly differs from the first set of communication resources. Then, the second device 1213 may successfully synchronize S142 on the second set of communication resources as part of the re-synchronizing S140.

Alternatively, in some other embodiments of the method of the present disclosure wherein the power saving information 43 is received S122 on a first set of D2D communication recourses, the second device 1213 determines S145 that synchronization on the second set of communication resources is unsuccessful, possibly due to not being able to receive S141 the SS 44. Then, the second device 12b may instead successfully receive S146 the sync signal 44 on the first set of communication resources and synchronize S147 on the first set of communication resources as part of the re-synchronizing S140.

Generally, the first set of resources may be used by the first device 12a for initiating connection with a plurality of second devices 12b, why it may be convenient to instruct each of the second devices to use a second set of resources for any further communication in order to not clog up the first set of resources. Information about the second set of resources (same or different for the different second devices 12b) may e.g. be sent to each second device 12b as part of the power saving information received S122 by the second device, or be sent separately. However, if the second device 12b fails to re-synchronize using the second set of resources, it may revert back to use the first set of resources. If the second device 12b is not successful in re-synchronizing on the first resources either, it may leave the power saving mode.

Additionally or alternatively, in some embodiments of the method of the present disclosure, the second device 12b may, after the re-synchronizing S140, receive S150 a wake-up signal 45 prompting the second wireless transceiver device 12b to enter an active period in accordance with the power saving mode configuration. If no wake-up signal is received S150, then the second device may go back to sleep again by entering a sleep period and possibly again start the sleep period timer.

In some embodiments of the method of the present disclosure, the power saving information 43 is transmitted S20 from the first device 12a and received S122 by the second device 12b on a first set of D2D communication recourses, wherein said first set of communication resources is a subset of available communication resources for the first wireless transceiver device 12a. In some embodiments, the power saving information 43 also comprises information about a second set of communication resources for D2D communication between the first wireless transceiver device 12a and the second wireless transceiver device 12b, wherein said second set of communication resources is a subset of available communication resources for the first wireless transceiver device which at least partly differs from the first set of communication resources. In some embodiments, the sync signal 44 is transmitted S30 by the first device 12a and possibly received S141 on the second set of communication resources.

In some embodiments of the method of the present disclosure, the power saving information 43 also comprises information about which signals the second wireless transceiver device 12b should monitor during its active periods. The power saving information 43 may e.g. comprise information about DRX cycles used.

In some embodiments of the method of the present disclosure, the power saving information comprises information about a sleep period timer to be run during the sleep periods of the second wireless transceiver device 12b and an active period timer to be run during the active periods of the second wireless transceiver device in accordance with the power saving mode configuration.

Example 1—Method Performed by the Second Device 12b as an MTC UE

The MTC UE 12b detects a relay node 12a (the first device) and initiates a connection on a first pre-configured set of resources. UE capability information is sent Silo to the relay node 12a.

UE 12b determines S120 PSM configuration (active period timer, sleep period timer, DRX cycles in active mode, second set of f/t resources etc.). The determination S120 may be made by the UE 12b by receiving S122 a PSM configuration message from the relay node 12a. In another embodiment the PSM configuration may be pre-configured by standard or by other means determined S120 for instance by discovery information transmitted from the relay node 12a.

UE 12b turns off the transceiver once active period timer expires, and enters S130 a sleep period. A sleep period timer is started and only a coarse clock (and corresponding needed hardware) is on in order to keep track of the sleep period timer.

The sleep period timer is monitored and once it is close to expire (e.g. some 5-50 ms prior to expiry) the MTC UE 12b turn on the radio receiver (and other necessary parts) and re-synchronizes S140 to the relay node 12a. The re-synchronization is made by monitoring and detecting timing on the D2DSS 44. The D2DSS used for re-sync S140 may in some embodiment be received S146 on the first set of resources (and hence a retuning of carrier frequency may be needed for reception of SA 42 and data 46 on the second set of resources), while in other embodiment the re-sync S140 is made on D2DSS received S141 on the second set of f/t resources. In some embodiment, the MTC device 12b may first sync to D2DSS on the first set of resources and then on D2DSS on the second set of resources (depending on the respective D2DSS periodicities).

If the re-synchronization is successful, the MTC device 12b reads SA on the second set of resources according to the active time DRX cycle configured. Once SA 42 indicating paging (or other) info from the NW 10, it reads corresponding data 46 resource pointed out by the SA. This is done until the active period timer expires. Then, the sleep period timer is restarted and the second device 12b enters S130 a sleep period again.

If the re-sync failed S145 on the second set of resources (i.e. no D2DSS on second f/t resource reliably (signal-to-noise ratio (SNR)/signal level above threshold) detected, during a pre-defined time (received from configuration information)), the MTC UE 12b starts a re-establishment procedure. The MTC UE 12b tries to re-connect using first set of resources (sync S147 to D2DSS on first set of resources, then initiate contact). If it is successful then go back to determining S120 PSM information. However, if re-synchronization on the first set of resources also fails (fail to detect S146 D2DSS on first set of resources, or does not receive a response on the capability information transmission etc.), the MTC UE 12b leaves the PSM state.

Example 2—Method Performed by the First Device 12a as a Relay Node

The relay 12a receives S10 capability information from UE 12b transmitted on a first set of resources.

In an optional step, the relay 12a informs S12, possibly via D2D and other relay nodes 12c, the NW node 11 about UE 12b and its capabilities. Then, in an optional step, the relay node 12a receives S14 PSM configuration information (including second set of f/t resources) from the NW node 11. The PSM configuration is based at least in part on capability information 41 related to MTC UE 12b.

The PSM configuration is transmitted S20 from relay 12a to the MTC UE 12b on the first set of f/t resources.

In an optional step, during a sleep period of the MTC UE 12b (i.e. the UE 12b is not monitoring SA 42 according to configured active time DRX cycle), the relay node 12a stores S22 paging information received from NW node 11, the paging intended for UE 12b. Then, in an optional step, during an active period of the MTC UE 12b (i.e. monitoring SA 42 according to configured active time DRX cycle), the relay 12a sends S34 stored S22 paging information to MTC UE 12b.

In another optional step, during MTC UE 12b active period, the NW node 11 (or core NW 14) keeps track of the active time periods of the MTC UE 12*b*, and hence the NW node 11 pages the MTC UE 12*b* only during UE 12*b* active period.

Then, during UE 12*b* active period, the relay node 12*a* receives paging information from the NW node 11 and forwards S36 the received paging information to the MTC UE 12*b*.

In all embodiments above, the paging may include information that has in effect that the MTC UE 12*b* may leave the PSM.

Below follow some other aspects and embodiments of the present disclosure.

According to an aspect of the present disclosure, there is provided a first wireless transceiver device 12*a* for a D2D communication network boa supporting wireless D2D link between the first wireless transceiver device and a second wireless transceiver device 12*b* in the D2D network. The first wireless transceiver device is configured for providing the second wireless transceiver device with access to a cellular communication network 10*b* via the first wireless transceiver device. The first wireless transceiver device comprises means 24 for receiving S10 capability information 41 from the second wireless transceiver device 12*b* on wireless D2D communication resources. The first wireless transceiver device also comprises means 25 for transmitting S20 power saving information 43 about a power saving mode configuration based on the received capability information to the second transceiver device 12*b*, the power saving information comprising information about sleep/inactivity periods and active periods of the second transceiver device. The first wireless transceiver device may in some embodiments also comprise means 25 for transmitting S30 a sync signal 44 with a timing based at least in part on the power saving mode configuration, for facilitating re-synchronization of the second wireless transceiver device 12*b* with the first wireless transceiver device 12*a* in conjunction with an end of a sleep/inactivity period of the second wireless transceiver device in accordance with the power saving mode configuration.

According to another aspect of the present disclosure, there is provided a second wireless transceiver device 12*b* for a D2D communication network boa supporting wireless D2D link between the second wireless transceiver device and a first wireless transceiver device 12*a* in the D2D network. The second wireless transceiver device is configured for being provided access to a cellular communication network 10*b* via the first wireless transceiver device. The second wireless transceiver device comprises means 25 for transmitting Silo capability information 41 to the first wireless transceiver device 12*a* on wireless D2D communication resources. The second wireless transceiver device also comprises means 27 for determining S120 power saving information 43 about a power saving mode configuration, the power saving information comprising information about sleep/inactivity periods and active periods of the second transceiver device. The second wireless transceiver device also comprises means 28 for entering S130 a sleep/inactivity period in accordance with the power saving mode configuration. The second wireless transceiver device may in some embodiments also comprise means 29 for, in conjunction with an end of the sleep/inactivity period, re-synchronizing S140 with the first wireless transceiver device 12*a* by means of receiving a sync signal 44 from said first wireless transceiver device.

According to another aspect of the present disclosure, there is provided a method performed by a first wireless transceiver device 12*a* in a D2D communication network boa supporting wireless D2D link between the first wireless transceiver device and a second wireless transceiver device 12*b* in the D2D network, the second wireless transceiver device being provided with access to a cellular communication network 10*b* via the first wireless transceiver device. The method comprises receiving S10 a message 41 from the second wireless transceiver device 12*b* on wireless D2D communication resources. The message comprises information on the power saving need of the second wireless transceiver device. The message may e.g. be: (a) capability information; or (b) a request from second device 12*b* to enter power saving mode, e.g. containing timer information for sleep period timer and/or active period timer. The method also comprises transmitting S20 a configuration to the second wireless transceiver device. The configuration provides information on the sleep period (may alternatively be called inactive period/state) the second wireless transceiver device may enter. The configuration may e.g. be (a) a configuration prepared by the first device 12*a* for the second device 12*b* base on the capability of the second device, or (b) a grant of the second device's request to start a power saving mode, possibly updating timer info in the second device's timer request. The configuration may e.g. be (a) a timer (which runs down to zero for the second device to come out of sleep), or (b) a timer, period of active time, period of inactive time. In some embodiments, the method further comprises transmitting S30 a sync signal 44 with a timing based at least in part on the power saving mode configuration, for facilitating re-synchronization of the second wireless transceiver device 12*b* with the first wireless transceiver device 12*a* in conjunction with an end of a sleep period of the second wireless transceiver device in accordance with the power saving mode configuration.

In some embodiments of the present disclosure, the method performed in the first device 12*a* further comprises, before transmitting the configuration to the second wireless transceiver device 12*b*, sending an inquiry to a network node 11 in the cellular network 10*b* about the second wireless transceiver device. The method may than also comprise receiving information related to the second wireless transceiver device 12*b* from the network node 11 (this for example may be paging related info from a mobility management entity (MME), or stored info in a home subscriber server (HSS) about the second device 12*b*). The method may also comprise constructing the configuration to send to the second wireless transceiver device 12*b*.

In some embodiments of the present disclosure, the message 41 from the second wireless transceiver device 12*b* contains capability information of the second wireless transceiver device.

In some other embodiments of the present disclosure, the message 41 from the second wireless transceiver device 12*b* contains a request to enter a sleep period/inactive state.

In some embodiments of the present disclosure, the transmitted S20 configuration to the second wireless transceiver device 12*b* comprises a timer for the second wireless transceiver device to enter a sleep period/inactive state.

In some embodiments of the present disclosure, the transmitted S20 configuration to the second wireless transceiver device contains a periodicity value on the sleep period/inactive state.

In some embodiments of the present disclosure, the method performed in the first device 12*a* further comprises, notifying a network node 11 about the configuration of the sleep period/inactive state of the second wireless transceiver device 12*b*.

According to another aspect of the present disclosure, there is provided a method performed by a second wireless transceiver device 12b in a D2D communication network boa supporting wireless D2D link between the second wireless transceiver device and a first wireless transceiver device 12a in the D2D network, the second wireless transceiver device being provided with access to a cellular communication network 10b via the first wireless transceiver device. The method comprises transmitting Silo capability information 41 to the first wireless transceiver device 12a on wireless D2D communication resources. The method also comprises determining 8120 power saving information 43 about a power saving mode configuration. The method also comprises entering S130 an inactive state in accordance with the power saving mode configuration. In some embodiments, the power saving information comprising information about inactive state of the second transceiver device. In some embodiments, in conjunction with an end of the inactive state, the method also comprises re-synchronizing S140 with the first wireless transceiver device 12a by means of receiving a sync signal 44 from said first wireless transceiver device.

The present disclosure has mainly been described above with reference to a few embodiments. However, as is readily appreciated by a person skilled in the art, other embodiments than the ones disclosed above are equally possible within the scope of the present disclosure, as defined by the appended claims.

The invention claimed is:

1. A method performed by a first wireless transceiver device in a device-to-device (D2D) communication network supporting a wireless D2D link between the first wireless transceiver device and a second wireless transceiver device in the D2D network, the method comprising:
receiving capability information from the second wireless transceiver device on wireless D2D communication resources;
transmitting power saving information about a power saving mode configuration based on the received capability information to the second wireless transceiver device, the power saving information comprising information about sleep periods and active periods of the second transceiver device;
transmitting a sync signal with a timing based at least in part on the power saving mode configuration, for facilitating re-synchronization of the second wireless transceiver device with the first wireless transceiver device in conjunction with an end of a sleep period of the second wireless transceiver device in accordance with the power saving mode configuration; and
the first wireless transceiver device receiving and/or transmitting communications of the second wireless transceiver device via the D2D link, and wirelessly relaying, via another wireless link, the communications of the second wireless transceiver device to provide the second wireless transceiver device with access to a radio access node of a cellular communication network,
wherein the first wireless transceiver device is not the radio access node of the cellular communication network.

2. The method of claim 1, wherein the power saving information is transmitted on a first set of D2D communication resources, wherein said first set of communication resources is a subset of available communication resources for the first wireless transceiver device.

3. The method of claim 2, wherein the power saving information also comprises information about a second set of communication resources for D2D communication between the first wireless transceiver device and the second wireless transceiver device, wherein said second set of communication resources is a subset of available communication resources for the first wireless transceiver device which at least partly differs from the first set of communication resources.

4. The method of claim 3, wherein the sync signal is transmitted on the second set of communication resources.

5. The method of claim 1, wherein the power saving information also comprises information about which signals the second wireless transceiver device should monitor during its active periods.

6. The method of claim 1, further comprising:
transmitting information about the received capability information to the cellular network.

7. The method of claim 6, further comprising:
receiving power saving information about the power saving mode configuration from the cellular network before the transmitting power saving information to the second transceiver device.

8. The method of claim 1, further comprising:
after the transmitting of the sync signal, transmitting a wake-up signal for prompting the second wireless transceiver device to enter an active period in accordance with the power saving mode configuration.

9. The method of claim 1, further comprising:
storing information addressed to the second wireless transceiver device and received from the cellular network during a sleep period of the second wireless transceiver device in accordance with the power saving mode configuration; and
transmitting said information to the second wireless transceiver device during an active period of the second wireless transceiver device in accordance with the power saving mode configuration.

10. The method of claim 1, wherein the power saving information comprises information about a sleep period timer to be run during the sleep periods of the second wireless transceiver device and an active period timer to be run during the active periods of the second wireless transceiver device in accordance with the power saving mode configuration.

11. A first wireless transceiver device for a device-to-device (D2D) communication network supporting a wireless D2D link between the first wireless transceiver device and a second wireless transceiver device in the D2D network, the first wireless transceiver device comprising:
a processing unit; and
a storage medium storing instructions executable by said processing unit whereby said first wireless transceiver device is operative to:
receive capability information from the second wireless transceiver device on wireless D2D communication resources;
transmit power saving information about a power saving mode configuration based on the received capability information to the second wireless transceiver device, the power saving information comprising information about sleep periods and active periods of the second transceiver device;
transmit a sync signal with a timing based at least in part on the power saving mode configuration, for facilitating re-synchronization of the second wireless transceiver device with the first wireless transceiver device in conjunction with an end of a sleep period of the second wireless transceiver device in accordance with the power saving mode configuration; and receive and/or transmit communications of the second wireless transceiver device via the D2D link, and wirelessly relay, via another wireless link, the communications of the second wireless transceiver device to provide the second wireless transceiver device with access to a radio access node of a cellular communication network, wherein the first wireless transceiver device is not the radio access node of the cellular communication network.

12. A method performed by a second wireless transceiver device in a device-to-device (D2D) communication network supporting a wireless D2D link between the second wireless transceiver device and a first wireless transceiver device in the D2D network, the method comprising:

transmitting capability information to the first wireless transceiver device on wireless D2D communication resources;

receiving power saving information about a power saving mode configuration from the first wireless transceiver device, the power saving information comprising information about sleep periods and active periods of the second wireless transceiver device;

entering a sleep period in accordance with the power saving mode configuration;

in conjunction with an end of the sleep period, re-synchronizing with the first wireless transceiver device by means of receiving a sync signal from said first wireless transceiver device;

when not in the sleep period, obtaining access to a radio access node of a cellular communication network by receiving from the first wireless transceiver device and/or transmitting to the first wireless transceiver device, communications of the second wireless transceiver device via the D2D link, wherein the first wireless transceiver device is not the radio access node of the cellular communication network.

13. The method of claim 12, wherein the power saving information is received on a first set of D2D communication resources.

14. The method of claim 13, wherein the power saving information also comprises information about a second set of communication resources for D2D communication between the first wireless transceiver device and the second wireless transceiver device, wherein said second set of communication resources at least partly differs from the first set of communication resources.

15. The method of claim 14, wherein the re-synchronizing comprises:
receiving the sync signal on the second set of communication resources; and
successfully synchronizing on the second set of communication resources.

16. The method of claim 14, wherein the re-synchronizing comprises:
determining that synchronization on the second set of communication resources is unsuccessful;
receiving the sync signal on the first set of communication resources; and
successfully synchronizing on the first set of communication resources.

17. The method of claim 12, wherein the power saving information also comprises information about which signals the second wireless transceiver device should monitor during its active periods.

18. The method of claim 12, further comprising:
after the re-synchronizing, receiving a wake-up signal prompting the second wireless transceiver device to enter an active period in accordance with the power saving mode configuration.

19. The method of claim 12, wherein the power saving information comprises information about a sleep period timer to be run during the sleep periods of the second wireless transceiver device and an active period timer to be run during the active periods of the second wireless transceiver device in accordance with the power saving mode configuration.

20. A second wireless transceiver device for a device-to-device (D2D) communication network supporting a wireless D2D link between the second wireless transceiver device and a first wireless transceiver device in the D2D network, the second wireless transceiver device comprising:
a processing unit; and
a non-transitory storage medium storing instructions executable by said processing unit whereby said second wireless transceiver device is operative to:
transmit capability information to the first wireless transceiver device on wireless D2D communication resources;
receive power saving information about a power saving mode configuration from the first wireless transceiver device, the power saving information comprising information about sleep periods and active periods of the second wireless transceiver device;
enter a sleep period in accordance with the power saving mode configuration;
in conjunction with an end of the sleep period, re-synchronize with the first wireless transceiver device by means of receiving a sync signal from said first wireless transceiver device; and
when not in the sleep period, obtain access to a radio access node of a cellular communication network by receiving from the first wireless transceiver device and/or transmitting to the first wireless transceiver device communications of the second wireless transceiver device via the D2D link,
wherein the first wireless transceiver device is not the radio access node of the cellular communication network.

21. A non-transitory processor-readable storage medium comprising a computer program comprising computer program code which is able to, when run on processor circuitry of a first wireless transceiver device in a device-to-device (D2D) communication network supporting a wireless D2D link between the first wireless transceiver device and a second wireless transceiver device in the D2D network, cause the first wireless transceiver device to:
receive capability information from the second wireless transceiver device on wireless D2D communication resources;
transmit power saving information about a power saving mode configuration based on the received capability information to the second wireless transceiver device, the power saving information comprising information about sleep periods and active periods of the second transceiver device;
transmit a sync signal with a timing based at least in part on the power saving mode configuration, for facilitating re-synchronization of the second wireless transceiver device with the first wireless transceiver device in conjunction with an end of a sleep period of the second wireless transceiver device in accordance with the power saving mode configuration; and receive and/or transmit communications of the second wireless transceiver device via the D2D link, and wirelessly relay, via another wireless link, the communications of the second wireless transceiver device to provide the second wireless transceiver device with access to a radio access node of a cellular communication network, wherein the first wireless transceiver device is not the radio access node of the cellular communication network.

22. A non-transitory processor-readable storage medium comprising a computer program comprising computer program code which is able to, when run on processor circuitry of a second wireless transceiver device in a device-to-device (D2D) communication network supporting a wireless D2D link between the second wireless transceiver device and a first wireless transceiver device in the D2D network, cause the second wireless transceiver device to:

transmit capability information to the first wireless transceiver device on wireless D2D communication resources;

receive power saving information about a power saving mode configuration from the first wireless transceiver device, the power saving information comprising information about sleep periods and active periods of the second wireless transceiver device;

enter a sleep period in accordance with the power saving mode configuration;

in conjunction with an end of the sleep period, re-synchronize with the first wireless transceiver device by means of receiving a sync signal from said first wireless transceiver device; and when not in the sleep period, obtain access to a radio access node of a cellular communication network by receiving from the first wireless transceiver device and/or transmitting to the first wireless transceiver device communications of the second wireless transceiver device via the D2D link, wherein the first wireless transceiver device is not the radio access node of the cellular communication network.

* * * * *

UNITED STATES PATENT AND TRADEMARK OFFICE
CERTIFICATE OF CORRECTION

PATENT NO. : 9,794,873 B2
APPLICATION NO. : 14/541320
DATED : October 17, 2017
INVENTOR(S) : Lindoff et al.

Page 1 of 2

It is certified that error appears in the above-identified patent and that said Letters Patent is hereby corrected as shown below:

On the Title Page

In Item (72), under "Inventors", in Column 1, Line 1, delete "Bjarred" and insert -- Bjärred --, therefor.

In the Specification

In Column 4, Line 22, delete "configuration. second" and insert -- configuration. Second --, therefor.

In Column 5, Line 29, delete "in stead" and insert -- instead --, therefor.

In Column 7, Line 2, delete "boa" and insert -- 10a --, therefor.

In Column 7, Line 6, delete "Multiplex)," and insert -- Multiple Access), --, therefor.

In Column 7, Line 47, delete "13b-e" and insert -- 13a-e --, therefor.

In Column 7, Line 50, delete "boa" and insert -- 10a --, therefor.

In Column 8, Line 26, delete "boa" and insert -- 10a --, therefor.

In Column 8, Line 54, delete "boa" and insert -- 10a --, therefor.

In Column 11, Line 2, delete "boa" and insert -- 10a --, therefor.

In Column 11, Line 46, delete "second device 12a." and insert -- second device 12b. --, therefor.

In Column 12, Line 7, delete "boa" and insert -- 10a --, therefor.

Signed and Sealed this
Sixth Day of March, 2018

Andrei Iancu
*Director of the United States Patent and Trademark Office*

CERTIFICATE OF CORRECTION (continued)
U.S. Pat. No. 9,794,873 B2

In Column 12, Line 12, delete "Silo" and insert -- S110 --, therefor.

In Column 12, Line 28, delete "Silo" and insert -- S110 --, therefor.

In Column 12, Line 42, delete "1213" and insert -- 12b --, therefor.

In Column 12, Line 45, delete "1213" and insert -- 12b --, therefor.

In Column 12, Line 51, delete "1213" and insert -- 12b --, therefor.

In Column 13, Line 55, delete "Silo" and insert -- S110 --, therefor.

In Column 15, Line 15, delete "boa" and insert -- 10b --, therefor.

In Column 15, Line 42, delete "boa" and insert -- 10b --, therefor.

In Column 15, Line 49, delete "Silo" and insert -- S110 --, therefor.

In Column 16, Line 1, delete "boa" and insert -- 10b --, therefor.

In Column 17, Line 4, delete "boa" and insert -- 10b --, therefor.

In Column 17, Line 9, delete "Silo" and insert -- S110 --, therefor.

In Column 17, Line 12, delete "8120" and insert -- S120 --, therefor.